United States Patent
Mearini et al.

(10) Patent No.: US 6,788,841 B2
(45) Date of Patent: Sep. 7, 2004

(54) DIAMOND-LIKE CARBON HEAT SINK FOR REFLECTIVE OPTICAL SWITCHES AND DEVICES

(75) Inventors: Gerald T. Mearini, Shaker Heights, OH (US); Laszlo A. Takacs, Shaker Heights, OH (US)

(73) Assignee: GENVAC Corporation, Cleveland, OH (US)

( * ) Notice: Subject to any disclaimer, the term of this patent is extended or adjusted under 35 U.S.C. 154(b) by 57 days.

(21) Appl. No.: 10/050,262

(22) Filed: Jan. 16, 2002

(65) Prior Publication Data

US 2003/0133645 A1 Jul. 17, 2003

(51) Int. Cl.⁷ .......................... G02B 6/35; G02B 26/08
(52) U.S. Cl. ........................................ 385/18; 385/19
(58) Field of Search ................................ 385/16–19

(56) References Cited

U.S. PATENT DOCUMENTS

| | | | |
|---|---|---|---|
| 3,976,890 A | * 8/1976 | Barnes et al. | 359/883 |
| 5,568,286 A | 10/1996 | Riza | |
| 5,580,429 A | * 12/1996 | Chan et al. | 204/192.38 |
| 5,923,798 A | 7/1999 | Aksyuk et al. | |
| 5,960,132 A | 9/1999 | Lin | |
| 6,097,859 A | * 8/2000 | Solgaard et al. | 385/17 |
| 6,229,640 B1 | 5/2001 | Zhang | |
| 6,243,507 B1 | 6/2001 | Goldstein et al. | |
| 6,313,936 B1 | 11/2001 | Holmes | |
| 6,396,976 B1 | * 5/2002 | Little et al. | 385/18 |

\* cited by examiner

*Primary Examiner*—Akm Enayet Ullah
*Assistant Examiner*—Jerry T Rahll
(74) *Attorney, Agent, or Firm*—Fay, Sharpe, Fagan, Minnich & McKee, LLP

(57) ABSTRACT

A reflective optical switch device includes a diamond-like carbon (DLC) heat sink layer disposed adjacent a reflective layer. In one embodiment, the reflective optical switch is a MEMS mirror having a substrate layer, a DLC heat sink layer, which is vapor deposited on the substrate layer, and a reflective layer deposited over the heat sink layer. In another embodiment, the optical switch device is a reflective LC-based switch having a first substrate, a DLC heat sink layer deposited over the first substrate, and an LC medium provided between a reflective electrode layer and a transmissive electrode layer. The DLC heat sink enables rapid dissipation and distribution of laser light induced heat away from the local target area of the reflective surface, thereby reducing deformation of the reflective surface and/or alteration of the optical properties within the local region to enhance performance.

14 Claims, 6 Drawing Sheets

DIAMOND-LIKE CARBON HEAT SINK FOR REFLECTIVE OPTICAL SWITCHES AND DEVICES

BACKGROUND OF THE INVENTION

The present invention relates to optical switch devices for use in optical communications systems. It finds particular application in conjunction with a heat sink for eliminating local heating in Microelectromechanical Systems (MEMS)-based optical switch devices, and will be described with particular reference thereto. It is to be appreciated, however, that the present invention is also applicable to other high speed optical switch devices, such as liquid crystal (LC)-based optical switches.

Optical communication systems are a substantial and rapidly growing part of communications networks. "Optical communication system," as used herein, relates to any system that uses optical signals to convey information across an optical transmission device, such as a fiber-optic cable. Such optical communication systems include, but are not limited to, telecommunications systems, cable television systems, and local area networks (LANs).

As optical communication systems assume a greater role in communications networks, there exists a need for a cost-effective way to increase the capacity of existing optical transmission devices. While the overall capacity of optical communication systems may be expanded, e.g., by laying more fiber-optic cables, the cost of such expansion is somewhat prohibitive.

Dense Wavelength Division Multiplexer (DWDM) systems have been adopted as a means to increase the capacity of existing optical communication systems. DWDM systems enable information, in the form of multiple optical signals, to be delivered inside a fiber-optic cable at multiple wavelengths. The increase in bandwidth is limited only by the number of wavelengths that can be superimposed on a fiber. During transmission, information is packaged within phase modulated carriers at specific wavelengths and superimposed or multiplexed on the fiber. During reception, the carriers are separated or demultiplexed.

The ability to switch or route signals from one transmission device to another is an essential part of effective optical communication systems. High-speed optical switch devices, such as the LC-based Wavelength Selective Switch™ and the Dynamic Spectral Equalizer™, both developed by Corning Incorporated, facilitate selective interaction with wavelengths entering the devices in multiplexed packets of multiple wavelengths carried in a single laser beam. Current LC-based switch devices are used in optical communication systems capable of multiplexing and demultiplexing up to 40 channels.

In LC-based switch devices, wavelength selection results from changes in the polarization of the multiplexed laser signal passing through the liquid crystal medium. The polarizations of the incoming wavelengths are rotated depending upon the voltage applied to the outer plates or electrodes, which house the liquid crystal. Switching is accomplished by directing light with differentially rotated polarizations through polarization sensitive filters and beam splitters, thus allowing the incoming light to be selectively directed to the proper output ports.

One type of LC-based optical switch is known as a transmissive LC-based switch. As shown in FIG. 1, the transmissive LC-based switch 100 includes outer electrodes 102, 103, which generally are thin films of a transparent and electrically conductive coating, disposed on opposite sides of the liquid crystal medium 104. The outer electrodes allow the laser light 106 to pass through the liquid crystal medium 104 with minimum light absorption or reflection.

As shown in FIG. 2, by utilizing a transmissive electrode 202 on the front side of the liquid crystal 204 and a reflective electrode 203 on the back side, a reflective LC-based optical switch 200 is formed. The reflective LC-based optical switch 200 provides increased polarization control of incoming light by passing the light through the liquid crystal more than once.

Another high speed optical switch device takes form in an optical cross connect device, which utilizes Microelectromechanical system (MEMS) mirror arrays to redirect a beam of light traveling in free-space along a first direction to a second direction. Demultiplexed signals enter the crossconnect and individual incoming wavelengths can be redirected to different outgoing fibers.

Optical devices that depend upon the reflection of laser light, such as the LC-based and MEMS-based optical switch devices described above, may be compromised by the highly focussed laser light to which they are exposed. For example, in MEMS-based switch devices, localized heating due to laser light exposure often leads to warping or general deformation of the reflective surface, which negatively affects performance. Similarly, in LC-based switch devices, localized heating of the reflective surface occurs, which often leads to alteration of the optical properties of the LC in the local region and diminished performance.

The present invention contemplates a new and improved optical switching device, which overcomes the above-referenced problems and others.

SUMMARY OF THE INVENTION

In accordance with one aspect of the present invention, an optical switch device, which redirects at least a portion of a beam of light traveling along a first direction to a second direction, includes a base member and a reflective panel pivotally connected to the base member. The reflective panel includes a first substrate, a reflective layer disposed above the first substrate, and a heat sink layer disposed between the first substrate and the reflective layer.

In accordance with a more limited aspect of the present invention, the heat sink layer is comprised of hydrogenated amorphous carbon.

In accordance with a more limited aspect of the present invention, the heat sink layer is comprised of diamond-like carbon (DLC).

In accordance with a more limited aspect of the present invention, the heat sink layer is comprised of diamond.

In accordance with a more limited aspect of the present invention, the optical switch device includes an actuator connected to the base member and the reflective panel. The actuator is operative to move the reflective panel between a reflective state and a non-reflective state.

In accordance with a more limited aspect of the present invention, the reflective panel includes a liquid crystal layer disposed above the reflective layer, a transmissive electrode layer disposed above the liquid crystal layer, and a second substrate disposed above the transmissive electrode layer.

In accordance with another aspect of the present invention, an optical communication system includes a plurality of input fibers operative to emit light beams and a first microelectromechanical mirror positioned to receive light beams emitted by at least one of the input fibers. The first microelectromechanical mirror is adapted to selectively reflect light beams along a plurality of paths. The first microelectromechanical mirror includes a substrate, a heat sink layer covering the substrate, and a reflective layer covering the heat sink layer. A plurality of output fibers receive reflected light beams.

In accordance with a more limited aspect of the present invention, the heat sink layer is comprised of diamond-like carbon (DLC) having a thickness between 2.0 nm and 4000 nm.

In accordance with a more limited aspect of the present invention, the optical communication system further includes a second microelectromechanical mirror positioned to receive light beams reflected by the first microelectromechanical mirror. The second microelectromechanical mirror is adapted to reflect light beams along a path toward at least one of the output fibers.

In accordance with another aspect of the present invention, a reflective optical switch device includes at least one substrate layer and a reflective layer for reflecting laser beams incident upon a local area. In this device, a method of dissipating heat from the local area of the reflective surface includes providing a hydrogenated amorphous carbon layer between the reflective layer and the substrate.

In accordance with a more limited aspect of the present invention, the providing step includes chemical vapor depositing the DLC on the substrate in a thickness of between 2.0 nm and 4000 nm.

In accordance with another aspect of the present invention, a method of making a reflective optical switch includes providing a first substrate layer and providing a hydrogenated amorphous carbon heat sink layer over the first substrate layer. The method further includes providing a reflective layer over the heat sink layer, where the reflective layer is suitable to redirect light beams incident thereon.

In accordance with a more limited aspect of the present invention, the method further includes providing a liquid crystal (LC) layer over the reflective layer and providing a transmissive electrode layer over the LC layer. A second substrate is then provided over the transmissive electrode layer One advantage of the present invention resides in reduced localized heating and deformation of the reflective surface.

Another advantage of the present invention resides in preventing the alteration of optical properties in the local region.

Another advantage of the present invention resides in reduced surface roughness for the reflective surface.

Yet another advantage of the present invention resides in uniform heat distribution over the entire reflective surface.

Still other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
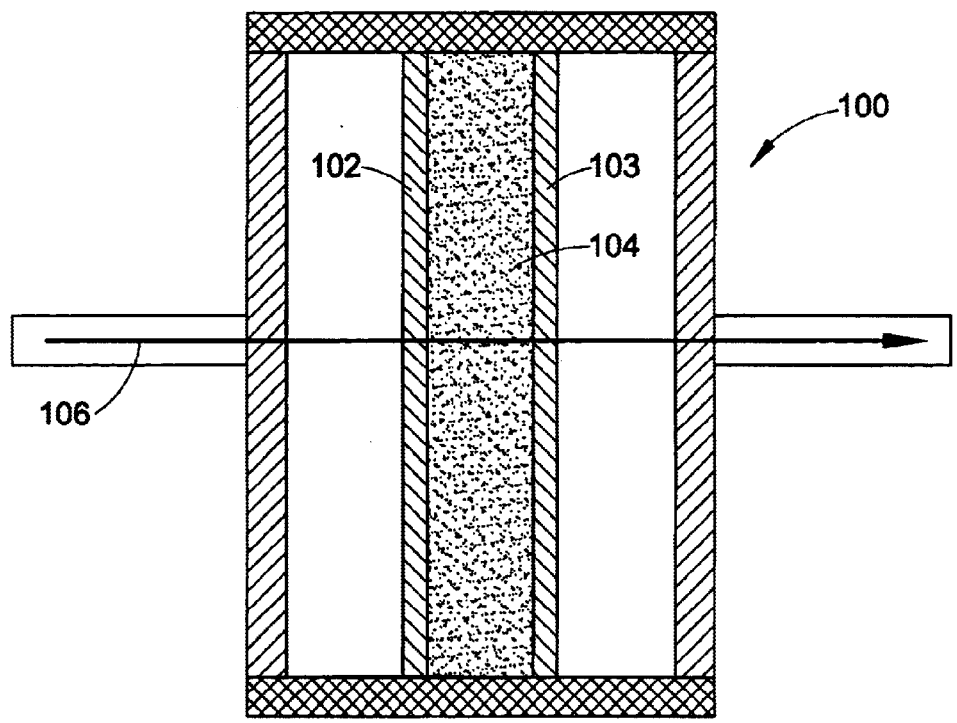
FIG. 1 is a diagrammatic illustration of a conventional transmissive LC-based switch.
Figure 2:
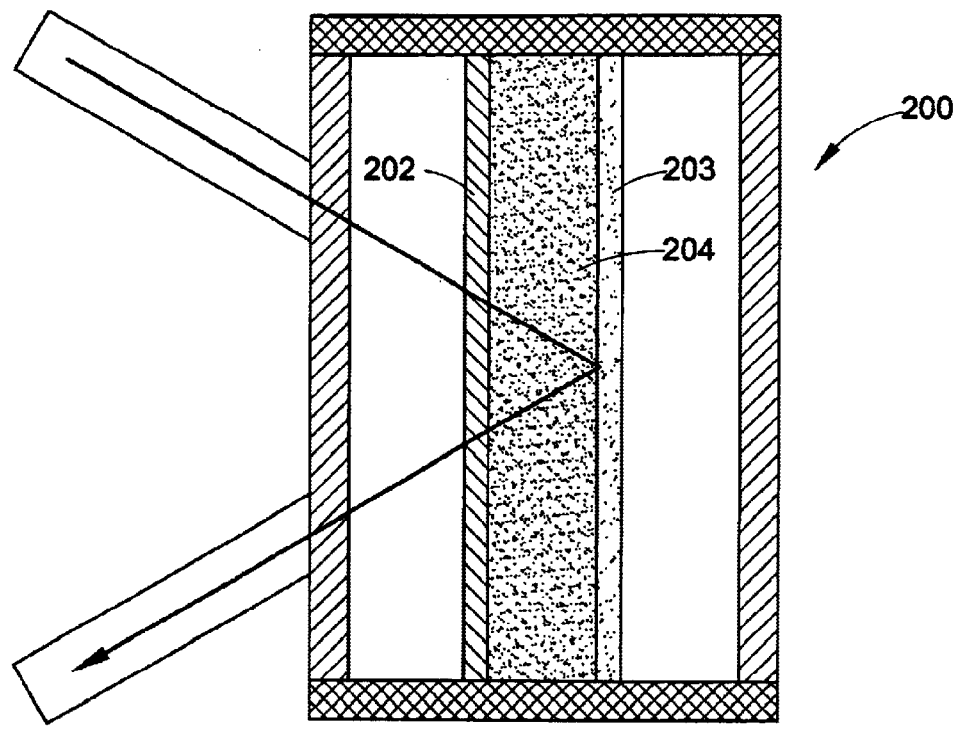
FIG. 2 is a diagrammatic illustration of a conventional reflective LC-based switch.
Figure 3:
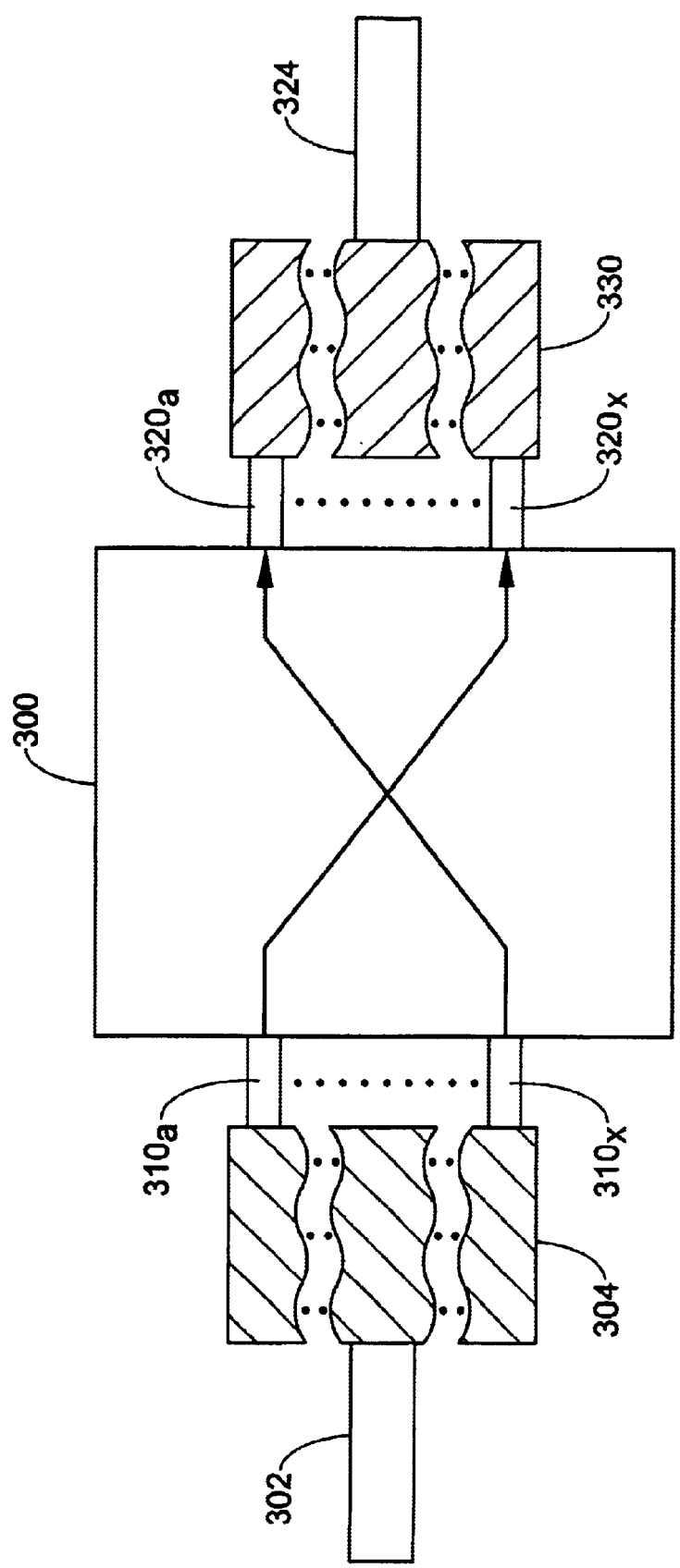
FIG. 3 is diagrammatic illustration of a conventional optical cross connect utilizing MEMS-based mirror arrays.

With reference to FIG. 3, a free-space optical cross connect apparatus 300 is employed in a Dense Wavelength Division Multiplexer (DWDM) system. The cross connect apparatus 300 bring together many fibers and facilitates the addition, subtraction, and/or rerouting of individual wavelengths. More particularly, multiple optical signals are delivered at multiple wavelengths via an input fiber 302 to a demultiplexer 304. In other words, during transmission, information is packaged within phased modulated carriers and superimposed on the fiber. The optical signals are received and demultiplexed or separated by the demultiplexer 304 into various wavelengths carried along incoming fibers $310_a$ . . . $310_x$ which enter the optical cross connect. As is described more fully below, the optical cross connect 300 includes a plurality of microelectromechanical system (MEMS) mirror arrays, which serve to redirect the demultiplexed signals into various outgoing fibers $320_a$ . . . $320_x$. The redirected signals are superimposed or multiplexed onto an output fiber 324 by a multiplexer 330.

Figure 4:
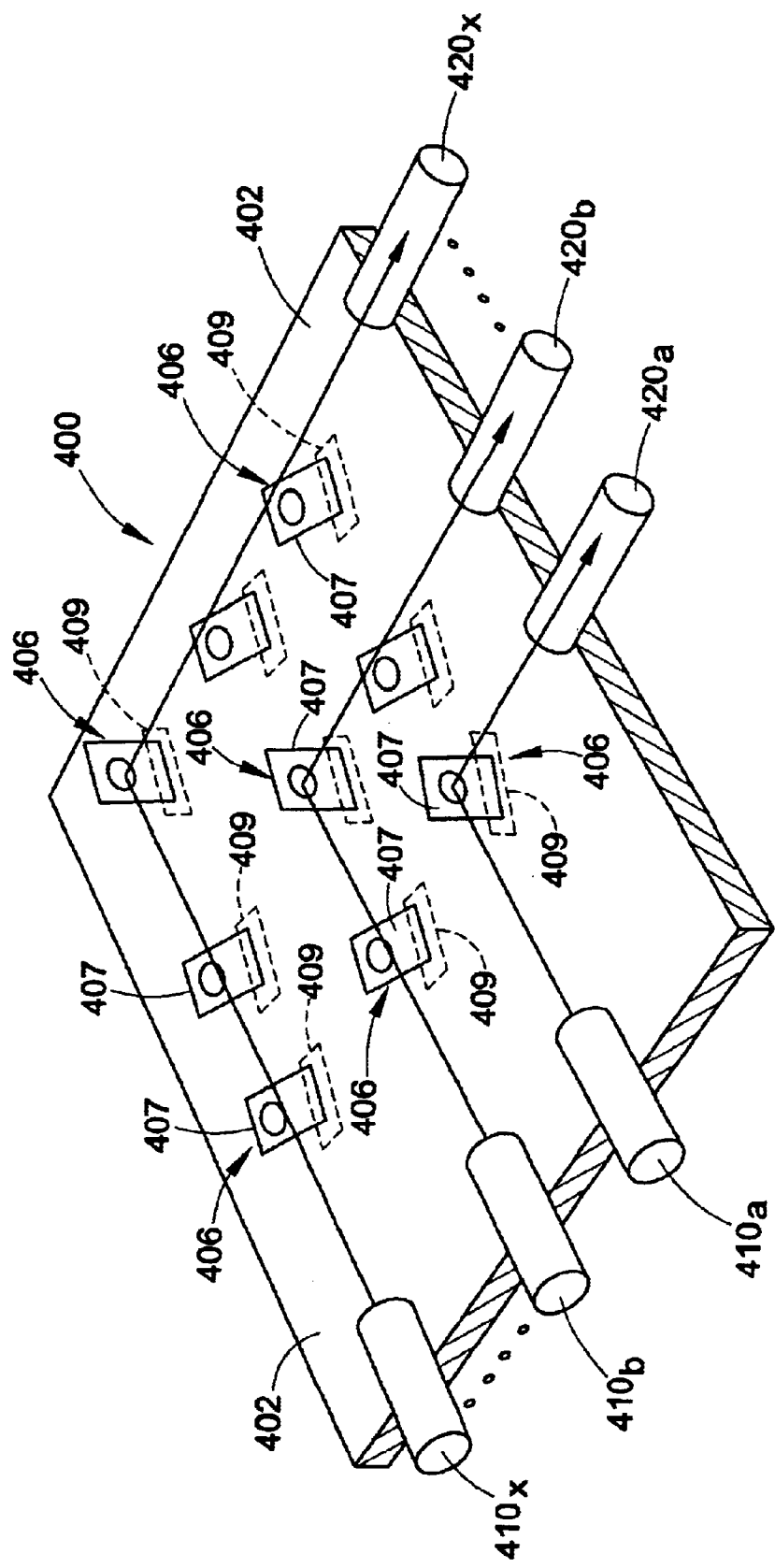
FIG. 4 is a perspective view of an optical cross connect apparatus employing a plurality of optical switch devices in accordance with the present invention.

With reference to FIG. 4 and continuing reference to FIG. 3, in one embodiment, the optical cross connect apparatus 400 includes a base member 402, an array of optical switch devices 406, and a plurality of input fibers $410_a$, $410_b$ . . . $410_x$ and output fibers $420_a$, $420_b$ . . . $420_x$. The array of optical switch devices 406 are operatively connected to the base member 402 and, in one embodiment, arranged in plurality of columns and rows. However, it is to be appreciated that the optical switch devices may be arranged in a plurality of configurations operative to switch or otherwise selectively redirect light beams from one or more of the input fibers $410g_a$, $410_b$ . . . $410_x$ to one or more of the output fibers $420_a$, $420_b$ . . . $420_x$.

More particularly, each optical switch device 406 includes a base member 402, a reflective panel 407 and an actuator 409. The reflective panel 407 is pivotally connected to the base member 402 and moves in an unbiased manner between a reflective state and a non-reflective state. Artisans will appreciate that in the reflective state, the reflective panel is disposed substantially perpendicularly relative to the base member. Conversely, in the non-reflective state, the reflective panel is disposed in a facially opposing relationship with the base member.

In one embodiment of the present invention, the plurality of optical switch devices within the optical cross connect are microelectromechanical system (MEMS) mirrors. More particularly, with reference to FIG. 5, the optical cross connect 500 includes a first MEMS mirror $506_a$ positioned to receive one or more incoming light beams 530 from at least one input fiber or source $510_b$ within a local target area 534 on a reflective surface. Before the light falls on a particular MEMS mirror, the mirror is positioned or aimed to reflect light/along a selected path. The path along which the light travels corresponds to a located of a selected target, in this case, output fiber $520_c$. For some targets, such as an optical fiber, it is desirable that the light being transmitted to the target be substantially parallel to the normal axis of the target. In the embodiment illustrated in FIG. 5, if the first MEMS mirror $506_a$ were to reflect light directly to a fiber optic target, it may cause the light to be nonparallel to the normal axis of the target. To address this problem, a second MEMS mirror $506_b$ is provided. The first MEMS mirror $506_a$ reflects light beam 530 to the second MEMS mirror $506_b$, which is aligned with the axis of target output fiber $520_c$ and reflects the light parallel to the preferred axis of the target. As is described more fully below, to reduce heating of the local target area 534 for each MEMS mirror, a heat sink layer 512 is provided between the reflective layer 514 and the substrate layer 516.

Figure 5:
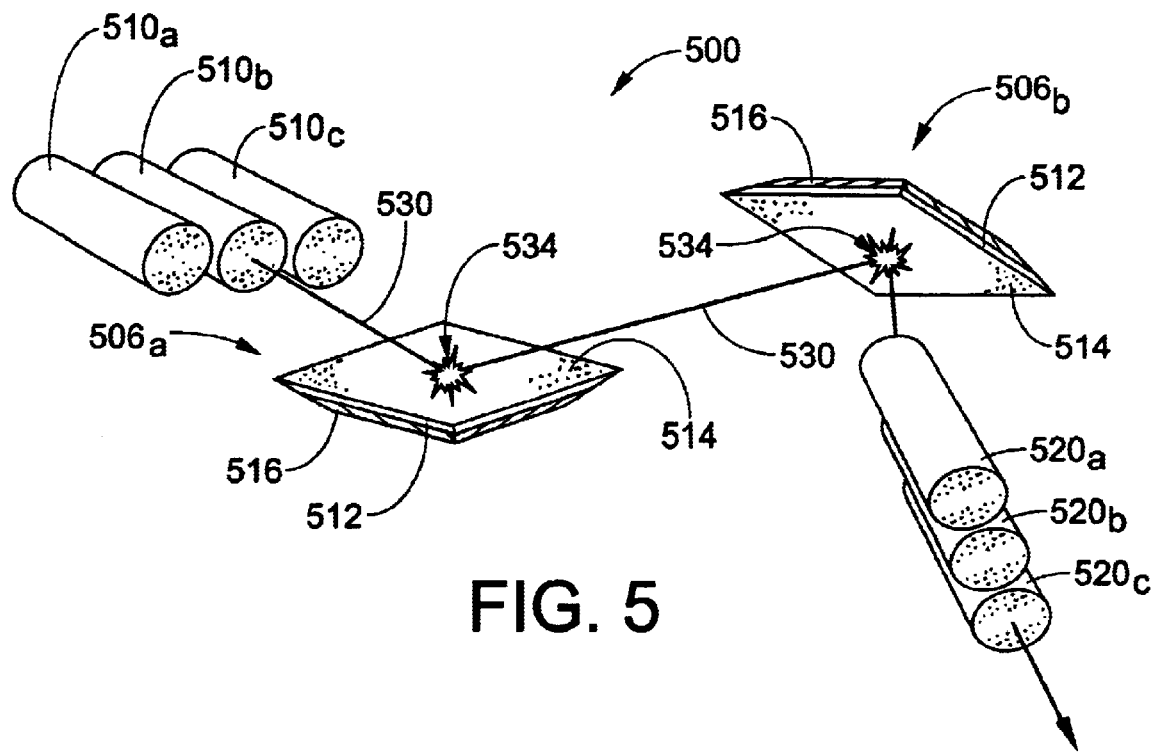
FIG. 5 is a diagrammatic illustration of a portion of an optical cross connect utilizing MEMS-based mirrors in accordance with the present invention.
Figure 6:
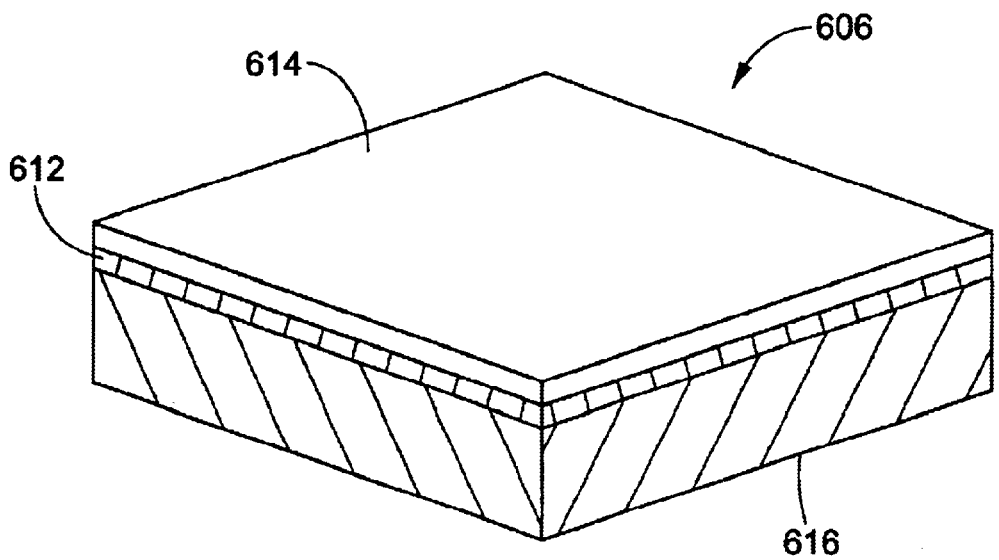
FIG. 6 is a perspective view of a reflective panel of a MEMS-based optical switch in accordance with the present invention.
Figure 7A:
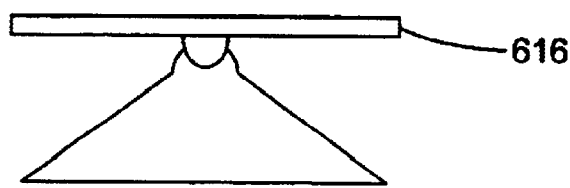
FIGS. 7A, 7B, and 7C are diagrammatic illustrations providing a method of making an optical switch device in accordance with the present invention.
Figure 7B:
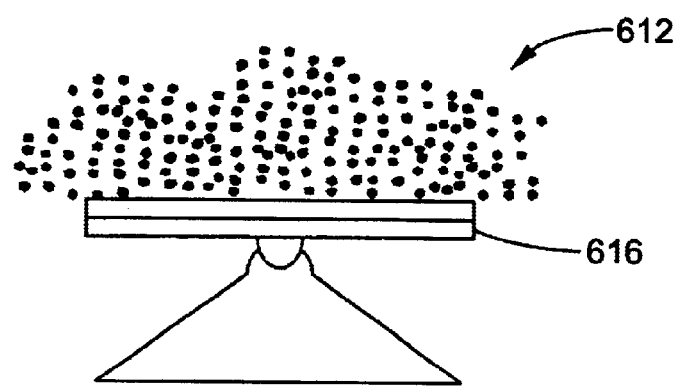

With reference to FIG. 6 and FIGS. 7A–7C and continuing reference to FIG. 5, each MEMS mirror 606 includes a first substrate layer 616 (FIG. 7A). Preferably, the substrate layer is comprised of a silicon-based material, such as fused silica or glass. Preferably, a diamond-like carbon (DLC) heat sink layer 612 is deposited onto the substrate layer 616 (FIG. 7B). DLC is a hydrogenated amorphous carbon material that exhibits physical and thermal similarities to diamond. In one embodiment, the DLC is produced in a vacuum by one of several well-known deposition processes, such as plasma enhanced chemical vapor deposition (PECVD) or ion beam deposition (IBD). While DLC is the preferred material for the heat sink, it is to be appreciated that the heat sink layer may be comprised of another hydrogenated amorphous carbon material. Alternately, the heat sink layer may be comprised of another carbon thin film, such as naturally occurring or laboratory-grown diamond. Preferably, the heat sink layer 612 ranges in thickness from 2.0 nm–4000 nm depending upon the intensity and size of the incident laser light.

Figure 7C:
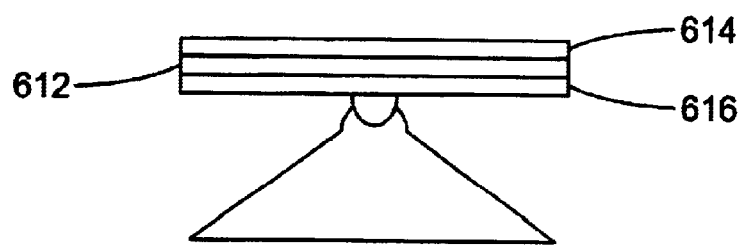

For reflective applications, a thin metallic film 614, such as gold, is deposited on top of the heat sink layer 612 in a thickness between 0.01 µm–10 µm (FIG. 7C). In this configuration, the heat sink improves the MEMS mirror performance by facilitating uniform distribution of heat over the entire mirror substrate. Therefore, the threshold above which appreciable warping occurs is increased considerably due to more uniform heating of the reflective surface.

Figure 8:
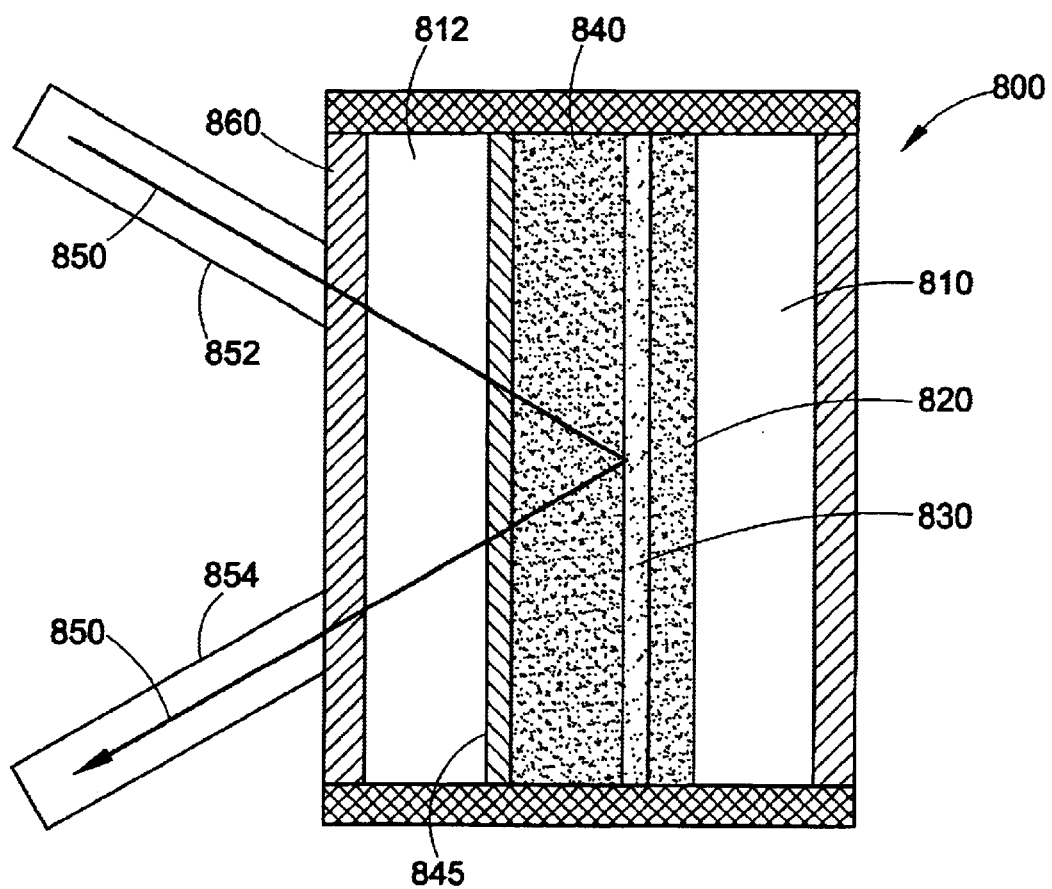
FIG. 8 is a diagrammatic illustration of an LC-based reflective optical switch in accordance with the present invention.

In another embodiment of the present invention illustrated in FIG. 8, the optical switch device includes a liquid crystal (LC) reflective switch 800. The LC-based reflective switch 800 includes a first silicon-based substrate 810. As is described above, a diamond-like carbon (DLC) heat sink layer 820 is deposited over the first substrate layer by a conventional deposition process, such as PECVD or IBD. It is to be appreciated that the DLC layer thickness ranges from 2.0 nm–4000 nm depending upon the intensity and spot size of the laser light incident upon the reflective surface. For reflective applications, the heat sink layer 820 is overcoated with a thin metallic film, such as gold, forming a reflective electrode layer 830. The reflective electrode layer 830 is deposited to a thickness of 100 nm–250 nm. A liquid crystal (LC) medium 840 is provided between the reflective electrode layer 830 and a transmissive electrode 845. The LC layer 840 serves to alter the polarization of a laser signal 850 traveling along input fiber 852. The laser signal 850 is reflected by reflective electrode 830, passing again through the LC medium 840, for further polarization alteration. The laser signal is then reflected or switched to output fiber 854. Preferably, the LC-based reflective switch includes a second silicon-based substrate layer 812 and an infrared anti-reflective coating 860, as shown It is to be appreciated that heat developed within the local target area on the reflective electrode layer travels faster through the reflective electrode layer to the substrate, rather than laterally, due to thickness of the reflective layer. Therefore, a sufficiently thick DLC layer present under the reflective layer enables rapid dissipation and distribution of the heat away from the local area, thereby reducing overheating of the LC layer and enhancing overall performance. In other words, the DLC heat sink layer 820 provides a thermally transparent path in which heat travels away from the reflective layer 830. The heat sink layer 820 uniformly distributes the heat laterally and funnels it into the first substrate layer 810, thus enabling the reflective layer to withstand exposure to higher intensity laser light before reaching the local heating threshold.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. An optical switch device for redirecting at least a portion of a beam of light traveling along a first direction to a second direction, said optical switch device comprising:

a base member; and
   a reflective panel pivotally connected to the base member, said reflective panel comprising:
   a first substrate;
   a reflective layer disposed above the first substrate;
   a heat sink layer comprised of a diamond-like carbon (DLC) disposed between the first substrate and the reflective layer,
   said DLC heat sink layer having a thickness between about 2.0 nm and 4000 nm.

2. The optical switch device according to claim 1, wherein the heat sink layer is comprised of hydrogenated amorphous carbon.

3. The optical switch device according to claim 1, wherein the heat sink layer is comprised of diamond.

4. The optical switch device according to claim 1, further comprising:

an actuator connected to the base member and the reflective panel, said actuator being operative to move the reflective panel between (i) a reflective state and (ii) a non-reflective state.

5. A method of making a reflective optical switch comprising:

(a) providing a first substrate layer comprised of a diamond-like carbon via enchanced chemical deposition;
   (b) providing a hydrogenated amorphous carbon heat sink layer over the first substrate layer; and,
   (c) providing a reflective layer over the heat sink layer, said reflective layer being suitable to redirect light beams incident thereon.

6. The method as set forth in claim 5 further including:

(d) providing a liquid crystal (LC) layer over the reflective layer;

(e) providing a transmissive electrode layer over the LC layer; and (f) providing a second substrate over the transmissive electrode layer.

7. An optical switch device for redirecting at least portion of a beam of light traveling along a first direction to a second direction, comprising, a base member; an a reflective panel pivotally connected to the base member, said reflective panel comprising:

a first substrate;

a reflective layer disposed above the first substrate;

a heat sink layer wherein the reflective panel further comprises:

a liquid crystal layer disposed above the reflective layer;

a transmissive electrode layer disposed above the liquid crystal layer; and a second substrate disposed above the transmissive electrode layer.

8. An optical communication system comprising:

a plurality of input fibers operative to emit light beams;

a first microelectromechanical mirror positioned to receive light beams emitted by at least one of the input fibers, said first microelectromechanical mirror being adapted to selectively reflect light beams a long a plurality of paths, said first microelectromechanical mirror including:

a substrate;

a heat sink layer comprised of diamond, hydrogenated amorphous carbon, or diamond-like carbon (DLC) covering the substrate said heat sink layer having a thickness between about 2.0 nm and 4000 nm, a reflective layer covering the heat sink layer; and, a plurality of output fibers operative to receive reflected light beams.

9. The optical communication system according to claim 8, wherein the heat sink layer is comprised of hydrogenated amorphous carbon.

10. The optical communication system according to claim 8, wherein the heat sink layer is comprised of diamond-like carbon (DLC).

11. The optical communication system according to claim 8, wherein the heat sink layer is comprised of diamond.

12. The optical communication system according to claim 8, further comprising:

a second microelectromechanical mirror positioned to receive light beams reflected by the first microelectromechanical mirror, said second microelectromechanical mirror being adapted to reflect light beams along a path toward at least one of the output fibers.

13. The method as set forth in claim 12 wherein the substrate has a thickness of between 2.0 nm and 4000 nm.

14. In a reflective optical switch device for use in an optical communication system, said optical switch device having at least one substrate layer, and a reflective layer for reflecting laser beams incident upon a local area, a method of dissipating heat from the local area of the reflective surface comprising:

providing a hydrogenated amorphous carbon layer of diamond-like carbon (DLC) between the reflective layer and the substrate by one of plasma enhanced chemical vapor depositing (PECVD), chemical vapor depositing (CVD) or ion beam depositing (IBD), the DLC on the substrate.

* * * * *